US011687709B2

(12) United States Patent
Zucker et al.

(10) Patent No.: US 11,687,709 B2
(45) Date of Patent: Jun. 27, 2023

(54) DOMAIN KNOWLEDGE BASED FEATURE EXTRACTION FOR ENHANCED TEXT REPRESENTATION

(71) Applicant: International Business Machines Corporation, Armonk, NY (US)

(72) Inventors: Dylan Zucker, New York, NY (US); Adham Suliman, Saint Petersburg, FL (US); Foad Khoshouei, North Arlington, NJ (US); ChunHui Y. Higgins, Raleigh, NC (US); Raghu Kiran Ganti, White Plains, NY (US); Shirley M. Han, New York, NY (US); Isaiah Santala, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 307 days.

(21) Appl. No.: 17/077,775

(22) Filed: Oct. 22, 2020

(65) Prior Publication Data
US 2022/0129625 A1    Apr. 28, 2022

(51) Int. Cl.
*G06F 40/20* (2020.01)
*G06F 16/22* (2019.01)
*G06F 17/16* (2006.01)
*G06N 20/00* (2019.01)
*G06F 16/28* (2019.01)

(52) U.S. Cl.
CPC .......... *G06F 40/20* (2020.01); *G06F 16/2264* (2019.01); *G06F 16/285* (2019.01); *G06F 17/16* (2013.01); *G06N 20/00* (2019.01)

(58) Field of Classification Search
CPC .... G06F 40/20; G06F 16/2264; G06F 16/285; G06F 17/16; G06N 20/00
See application file for complete search history.

(56) References Cited

U.S. PATENT DOCUMENTS

| 10,482,118 B2 | 11/2019 | Zheng |
| 10,489,438 B2 | 11/2019 | Bhatt et al. |
| 10,606,946 B2 | 3/2020 | Gao et al. |

(Continued)

OTHER PUBLICATIONS

Elsaadawy et al. ,"A Text Classifier Using Weighted Average Word Embedding" Dec. 2018 (Year: 2018).*

(Continued)

*Primary Examiner* — Bhavesh M Mehta
*Assistant Examiner* — Darioush Agahi
(74) *Attorney, Agent, or Firm* — Konrad Raynes Davda & Victor LLP; Rabindranath Dutta

(57) ABSTRACT

Provided are a method, system, and computer program product for representing text, in which a text is received and analyzed by utilizing a pre-trained embedding model and a feature vector model, wherein selected words in the text have corresponding weights. Operations whose parameters include weights of a feature vector and an embedding are performed to generate a weighted embedding data structure. A summation is performed of all corresponding columns of a plurality of rows of the weighted embedding data structure to generate a data structure that represents the text. The data structure that represents the text is utilized to generate at least one of a classification metadata for the text and a summarization of the text.

20 Claims, 9 Drawing Sheets

(56) References Cited

U.S. PATENT DOCUMENTS

| | | |
|---|---|---|
| 10,678,830 B2 | 6/2020 | Li et al. |
| 2017/0308790 A1 | 10/2017 | Nogueira dos Santos et al. |
| 2018/0165554 A1 | 6/2018 | Zhang et al. |
| 2019/0163817 A1* | 5/2019 | Milenova ............... G06N 20/00 |
| 2019/0354586 A1 | 11/2019 | Pastemack |
| 2020/0097554 A1* | 3/2020 | Rezagholizadeh .... G06N 3/084 |
| 2020/0104710 A1 | 4/2020 | Vasudevan et al. |
| 2020/0167429 A1 | 5/2020 | Katz et al. |
| 2020/0184339 A1 | 6/2020 | Li et al. |
| 2020/0250270 A1 | 8/2020 | Yu et al. |
| 2020/0251100 A1 | 8/2020 | Tan et al. |
| 2021/0383064 A1* | 12/2021 | Wang ................... G06F 40/166 |

OTHER PUBLICATIONS

Jian Huang, "Few-Shot Transfer Learning for Text Classification With Lightweight Word Embedding Based Models", IEEE Access, pp. 53296-53304 (Year: 2019).*

Elsaadawy et al.; "A Text Classifier Using Weighted Average Word Embedding", dated Dec. 17-20, 2018, JEC-ECC IEEE Conference On, Total 4 pages.

Z. Wang et al.; "Better Fine-Tuning Via Instance Weighting for Text Classification", dated Jan. 27-Feb. 1, 2019, 33rd AAAI-19 33rd AAAI Conference On, Total 8 pages.

D. Wang et al.; "W-RNN: News Text Classification Based On A Weighted RNN", dated Sep. 28, 2019, Cornell University Library, arXiv:1909.13077v1, Total 7 pages.

Al-Khatib et al.; "A Simple And Effective Approach For fine Tuning Pre-Trained Word Embeddings For Improving Text Classification", dated Aug. 7, 2019, Total 16 pages.

Mendes et al.; "Multi-Stage Transfer Learning With An Application To Selection Process", dated Jun. 1, 2020, 24th ECAI Conference On, Total 8 pages.

Collobert et al., "A Unified Architecture for Natural Language Processing: Deep Neural Networks with Multitask Learning" dated 2008, Appearing in Proceedings of the 25 th International Conference on Machine Learning, Helsinki, Finland, Total 8 pages.

* cited by examiner

Example for generation of vector representation of text by applying weights to domain specific word embeddings "The rain outside is cold" — 302

Custom Feature Extraction — 204

Domain Specific Word Embeddings — 206

303

{ 1, Number of Feature Vectors (4) }

| | rain | outside | cold | kw4 |
|---|---|---|---|---|
| | W1 | W2 | W3 | W4 |

304  306  308  310

Weight Embeddings

{ Number of Feature Vectors (4), Embedding Dimensions (6) } — 312

314

| | i=1 | i=2 | i=3 | i=4 | i=5 | i=6 |
|---|---|---|---|---|---|---|
| rain | X1,1 | X1,2 | X1,3 | X1,4 | X1,5 | X1,6 |
| outside | X2,1 | X2,2 | X2,3 | X2,4 | X2,5 | X2,6 |
| cold | X3,1 | X3,2 | X3,3 | X3,4 | X3,5 | X3,6 |
| kw4 | X4,1 | X4,2 | X4,3 | X4,4 | X4,5 | X4,6 |

316

| | i=1 | i=2 | i=3 | i=4 | i=5 | i=6 |
|---|---|---|---|---|---|---|
| rain | W1*X1,1 | W1*X1,2 | W1*X1,3 | W1*X1,4 | W1*X1,5 | W1*X1,6 |
| outside | W2*X2,1 | W2*X2,2 | W2*X2,3 | W2*X2,4 | W2*X2,5 | W2*X2,6 |
| cold | W3*X3,1 | W3*X3,2 | W3*X3,3 | W3*X3,4 | W3*X3,5 | W3*X3,6 |
| kw4 | W4*X4,1 | W4*X4,2 | W4*X4,3 | W4*X4,4 | W4*X4,5 | W4*X4,6 |

{ 1, Embedding Dimensions (6) }

318 — Column Σ

| Σ(Wi*Xi,1) | Σ(Wi*Xi,2) | Σ(Wi*Xi,3) | Σ(Wi*Xi,4) | Σ(Wi*Xi,5) | Σ(Wi*Xi,6) |
|---|---|---|---|---|---|

FIG. 3

DOMAIN KNOWLEDGE BASED FEATURE EXTRACTION FOR ENHANCED TEXT REPRESENTATION

BACKGROUND

Embodiments relate to domain knowledge based feature extraction for enhanced text representation.

A natural language processing (NLP) system implemented in a computational device may first perform a lexical analysis for identifying and analyzing the structure of words. Then a syntactic analysis may be performed for analysis of words in a sentence for grammar and for arranging words in a manner that shows the relationship among the words. Subsequent to syntactic analysis, a semantic analysis may be performed to derive meaning from the text. Then pragmatic analysis may be performed to incorporate those aspects of language that require real world knowledge. There are many other mechanisms by which natural language may be processed by natural language processing systems, where the natural language processing systems may often rely on machine learning mechanisms.

A text in a natural language may be a sequence of words, and texts may have to be interpreted by the natural language processing system for automated understanding and interpretation of natural language.

Machine learning applications learn from a pre-defined set of features from the training data to produce output for test data. However, machine learning applications do not usually take the raw text of natural language directly as input. As a result, in natural language processing, feature extraction techniques are used to convert text into a vector (or matrix) of features. Vectors in natural language processing is a numerical representation of an object, in the form of an ordered set of coordinates with respect to a numeric vector space In certain mechanisms, words may be represented in a vector space where each word in a lexicon forms its own dimension in the vector space. Word embedding is a natural language processing mechanism that maps words from a vocabulary to vectors of real numbers in an embedding space. Word embeddings have been widely used in recent years to improve the performance of a variety of natural language processing tasks.

SUMMARY OF THE PREFERRED EMBODIMENTS

Provided are a method, system, and computer program product for representing text, in which a text is received and analyzed by utilizing a pre-trained embedding model and a feature vector model, wherein selected words in the text have corresponding weights. Operations whose parameters include weights of a feature vector and an embedding are performed to generate a weighted embedding data structure. A summation is performed of all corresponding columns of a plurality of rows of the weighted embedding data structure to generate a data structure that represents the text. The data structure that represents the text is utilized to generate at least one of a classification metadata for the text and a summarization of the text.

In additional embodiments, the data structure that represents the text has a single row and a plurality of columns, wherein the plurality of columns corresponds to embedding dimensions.

In further embodiments, entries for each column of the single row are generated by summing weighted entries of a plurality of rows of an identical column of the weighted embedding data structure.

In yet further embodiments, the embedding is represented as a multi-dimensional data structure, wherein each row of the multi-dimensional data structure has a correspondence to a selected word, and each column of the multi-dimensional data structure corresponds to an embedding dimension.

In certain embodiments, the weighted embedding data structure is represented as a multi-dimensional data structure, wherein each row of the multi-dimensional data structure has a correspondence to a selected word, and each column of the multi-dimensional data structure corresponds to an embedding dimension, and wherein each entry of the multi-dimensional data structure is weighted based on the weights of the feature vector.

In additional embodiments, the performing of operations to generate the weighted embedding data structure comprises performing a dot product of the weights of the feature vector and the embedding.

In further embodiments, the text is represented by utilizing transfer learning from the pre-trained embedding model.

BRIEF DESCRIPTION OF THE DRAWINGS

Referring now to the drawings in which like reference numbers represent corresponding parts throughout:

FIG. 3 illustrates a block diagram that shows an example for the generation of a vector representation of text by applying weights to domain specific word embeddings, in accordance with certain embodiments;

DETAILED DESCRIPTION

Figure 1:
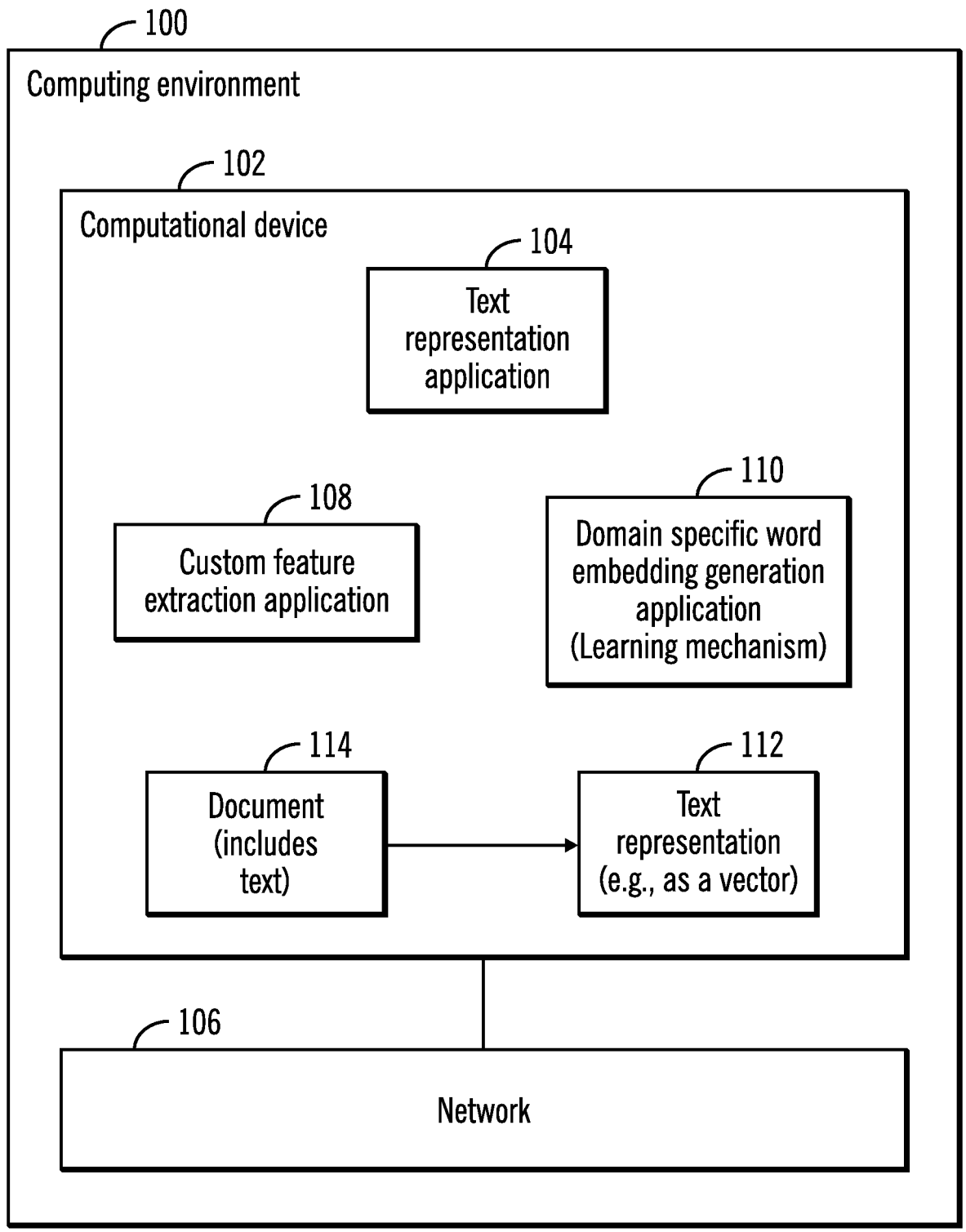
FIG. 1 illustrates a block diagram of a computing environment comprising a computational device that executes a text representation application, in accordance with certain embodiments.

In the following description, reference is made to the accompanying drawings which form a part hereof and which illustrate several embodiments. It is understood that other embodiments may be utilized and structural and operational changes may be made.

The domain for the usage of a word is of importance in natural language processing systems. For example, when a computer science related article includes a sentence about "memory" and another article includes a sentence about someone's "memory" of a past event, the word "memory" may be used as a label in the form of metadata for the computer science article, but the word "memory" may not be a relevant label in the article about someone's life event. Representation of words that incorporate knowledge on the domain of usage or contextual knowledge is of importance in natural language processing.

In natural language processing, there are a range of complexities on how to best represent a word, a phrase, a sentence, and a passage. Historically, encodings via Bag of Words (BOW) and term frequency-inverse document frequency (TF-IDF) mechanisms have been used to represent text. These mechanisms are inefficient in many situations since they generate very sparse representations and they do not account for the sequence of the words. One advancement in natural language processing has been the use of word embeddings trained on large amounts of text in order to capture the meaning and to represent words. Word2Vec and Glove are example systems of such word embeddings. One issue on the implementation of such mechanisms is how to best represent a long paragraph and feed that to a machine learning model. Mechanisms have tried averaging all the words within a passage, but that tends to dampen the signal and results in an average representation for all of the different passages and this reduces the performance of the model.

In order for computers to understand natural language, certain systems have created dictionaries where each word is associated with a certain number. An ability of a model to interpret text data is increased when a vector representation of each word is used instead of a single numerical value. These vector representations are called embeddings.

Embeddings create vectors for each word based on the context of the data it was trained on. As larger and more encompassing data sets are used in training, embeddings begin to attain a better vector representation for words within a certain corpus. Training these embeddings may entail very high costs and long training times. Several large organizations have provided pre-trained embeddings to the public. The open source community may use these trained embeddings due to the concept of transfer learning, where transfer learning focuses on storing knowledge gained while solving one problem and applying the stored knowledge to a different but related problem. For example, knowledge gained while learning to recognize cars may apply when trying to recognize trucks. Today, when someone has a natural language processing problem, they initiate one of these trained models and fine-tune their model by further training the model on their respective corpus.

The typical pipeline for a project in natural language today is to clean the text, identify the embeddings for the text, and then apply some sort of algorithm to those embeddings. In this disclosure, certain embodiments are described in which feature vectors from a clustering model are used to represent observations within the corpus. Each of the clusters is associated with a word. The feature vector is extracted from the text using a custom feature extraction model which provides weights associated with specific words. The text embeddings are obtained from a pre-trained embedding model.

Certain embodiments augment weights to the word embeddings by using the weights from the feature vector associated with each word. The embeddings are provided as input to a model. As a result, improvements are made to the representation of text in a computational device that executes a natural language processing system.

Exemplary Embodiments

FIG. 1 illustrates a block diagram of a computing environment 100 comprising a computational device 102 that executes a text representation application, in accordance with certain embodiments.

The computational device 102 may comprise any suitable computational device including those presently known in the art, such as, a personal computer, a workstation, a server, a mainframe, a hand held computer, a palm top computer, a telephony device, a network appliance, a blade computer, a processing device, a controller, etc. The computational device 102 may be coupled to any suitable network 106, such as, a local area network, a wide area network, the Internet, an intranet. In certain embodiments, the computational device 102 may be an element in a cloud computing environment.

The text representation application 104 in combination with a custom feature extraction application 108 and a domain specific word embedding application 110 (e.g., a machine learning mechanism), may generate the text representation 112 of text included in a natural language document 114. Feature vectors are extracted from the text using a custom feature extraction model which gives weights associated with specific words, and the word embeddings are obtained from a pre-trained embedding model by using the custom feature extraction application 108 and the domain specific word embedding application 110.

In certain embodiments, the text representation application 104, the custom feature extraction application 108 and the domain specific word embedding application 110 may be implemented in software, firmware, hardware, or any combination thereof. In alternative embodiments, the functions provided by the text representation application 104, the custom feature extraction application 108 and the domain specific word embedding application 110 may be provided by a fewer or a greater number of applications than shown in FIG. 1. For example, in certain embodiments the functions provided by the text representation application 104, the custom feature extraction application 108 and the domain specific word embedding application 110 may be combined into a single application.

In certain embodiments, the text included in the document 114 may be a sentence or some other construct, where the documents 114 may include a plurality of such constructs. The text representation application 104 may represent the construct, such as a sentence, in the form of a vector in the text representation 112.

Therefore, FIG. 1 illustrates certain embodiments in which a text representation application 104 represents the text contained in documents 114 in the form of a vector 112 (example of text representation 112) for interpretation of the documents 114 by a natural language processing system.

Figure 2:
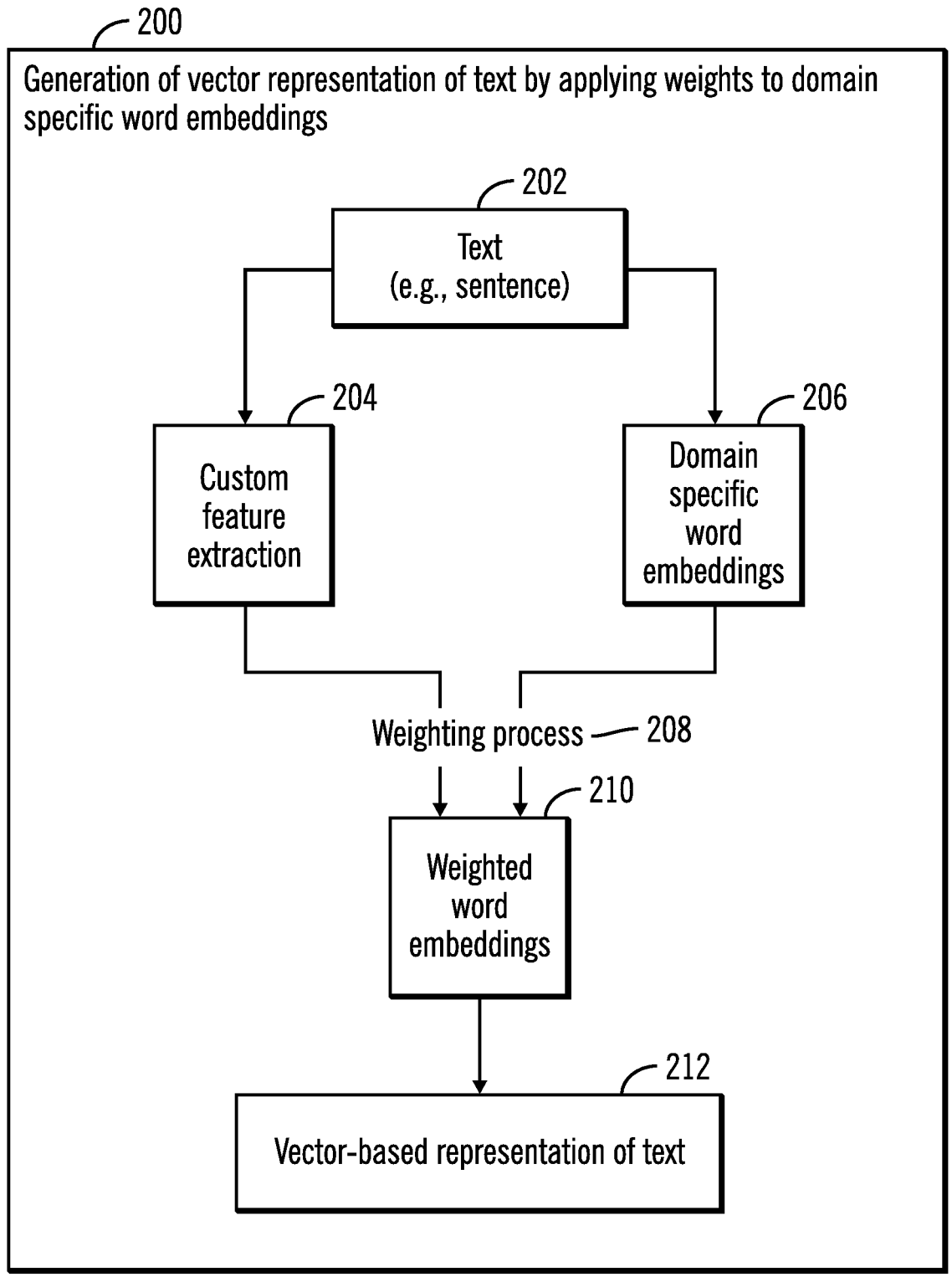
FIG. 2 illustrates a block diagram that shows the generation of a vector representation of text by applying weights to domain specific word embeddings, in accordance with certain embodiments.

FIG. 2 illustrates a block diagram 200 that shows the generation of a vector representation of text by applying weights to domain specific word embeddings, in accordance with certain embodiments. In certain embodiments, the operations shown in FIG. 2 may be performed by the text representation application 104, the custom feature extraction application 108 and the domain specific word embedding application 110 that execute in the computational device 102.

In certain embodiments a text 202, such as a sentence, is analyzed by the custom feature extraction application 108 to perform a custom feature extraction 204 and the domain specific word embedding application 110 to provide domain specific word embeddings 206. Weights for words are provided by the combination of the custom feature extraction application 108 and the domain specific word embedding application 110 to the text representation application 104.

The text representation application 104 use the domain specific word embeddings 206 and applies a weighting process 208 that uses the provided weights to generate weighted word embeddings 210. Subsequently the text representation application 104 processes the weighted word embeddings to generate a vector-based representation of a text such as a sentence (as shown via reference numeral 212). The vector-based representation of text 212 includes contextual information and domain knowledge as a result of the operations shown in FIG. 2.

FIG. 3 illustrates a block diagram 300 that shows an example for the generation of a vector representation of text by applying weights to domain specific word embeddings, in accordance with certain embodiments. In certain embodiments, the operations shown in FIG. 3 may be performed by the text representation application 104, the custom feature extraction application 108 and the domain specific word embedding application 110 that execute in the computational device 102.

An exemplary sentence ("The rain is cold" 302) is shown in FIG. 3, where the exemplary sentence is a text whose vector representation is to be generated by the text representation application 104.

The custom feature extraction 204 results indicate that the number of feature vectors are 4 (as shown via reference numeral 303). The keywords are "rain", "outside", "cold" from the sentence 302, and another keyword "kw4" that provide additional information. The keywords "rain", "outside", "cold", and "kw4" have weights W1, W2, W3, W4 respectively as shown via reference numerals 304, 306, 308, 310. In certain embodiments, the sum of the weights may be 1.

The domain specific word embeddings 206 indicate that the number of feature vectors are 4 where the embedding dimensions are 6 (as shown via reference numeral 312). The "dimensionality" in word embeddings may represent the total number of features that the word embedding encodes. The selection of features is usually not manual but is automatic by using hidden layer in the training process. Depending on the corpus of literature the most useful dimensions (features) are selected.

An exemplary domain specific word embedding data structure whose rows represent "rain", "outside", "cold" and "kw4" are shown (reference numeral 314). There are six embedding dimensions represented by the columns whose indexes are labeled as i ranging from 1 to 6.

The text representation application 104 applies the weights to each of the domain specific word embeddings to generate a weighted word embedding data structure (shown via reference numeral 316) that shows weighted word embeddings. For example, all entries of all columns of the row representing "rain" are multiplied by the weight W1, all entries of all columns of the row representing "outside" are multiplied by the weight W2, all entries of all columns of the row representing "cold" are multiplied by the weight W3, and all entries of all columns of the row representing "kw4" are multiplied by the weight W4. Thus, the weights of the words are used to weigh the word embeddings in the weighted embedding data structure 316.

Subsequently, the text representation application 104 adds the entries of each column of the weighted embedding data structure 316 to generate the data structure 318 to represent the sentence 302. Each entry in the data structure 318 is a real number, and the full set of real numbers corresponding to each column represents the sentence 302. As a result, a vector representation of a sentence is obtained.

Therefore FIG. 3 illustrates an embodiment in which the text representation in which a weighted representation of word embeddings followed by a summation of columns is used to represent a sentence or some other text.

Figure 4:
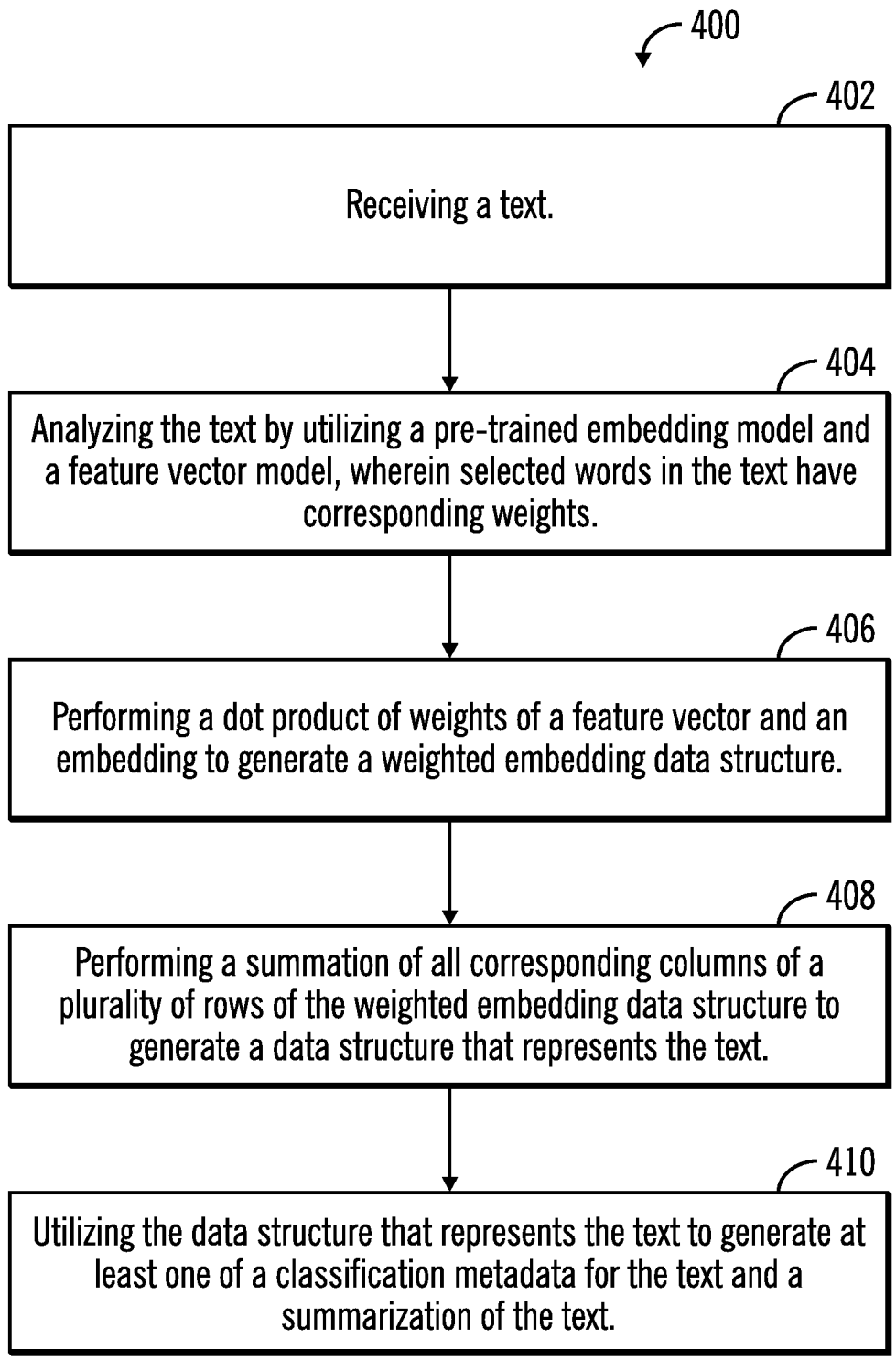
FIG. 4 illustrates a first flowchart that shows the generation of a vector representation of text by applying weights to domain specific word embeddings, in accordance with certain embodiments.

FIG. 4 illustrates a first flowchart 400 that shows the generation of a vector representation of text by applying weights to domain specific word embeddings, in accordance with certain embodiments. In certain embodiments, the operations shown in FIG. 4 may be performed by the text representation application 104, the custom feature extraction application 108 and the domain specific word embedding application 110 that execute in the computational device 102.

Control starts at block 402 in which a text is received. The received text is analyzed by utilizing a pre-trained embedding model and a feature vector model, wherein selected words in the text have corresponding weights (at block 404).

From block 404 control proceeds to block 406 in which a dot product of weights of a feature vector and an embedding is performed to generate the weighted embedding data structure 314. The dot product is a mechanism for arriving at the entries of weighted embedding data structure 316. In alternative embodiments, instead of the dot product other operations that arrive at the same results for the entries of the weighted embedding data structure may be performed, wherein the other operations may have parameters that include the weights of the feature vector and the embedding. A summation is performed (at block 408) of all corresponding columns of a plurality of rows of the weighted embedding data structure 314 to generate a data structure 318 that represents the text.

From block 408 control proceeds to block 410 in which the data structure that represents the text is utilized to generate at least one of a classification metadata for the text and a summarization of the text.

Figure 5:
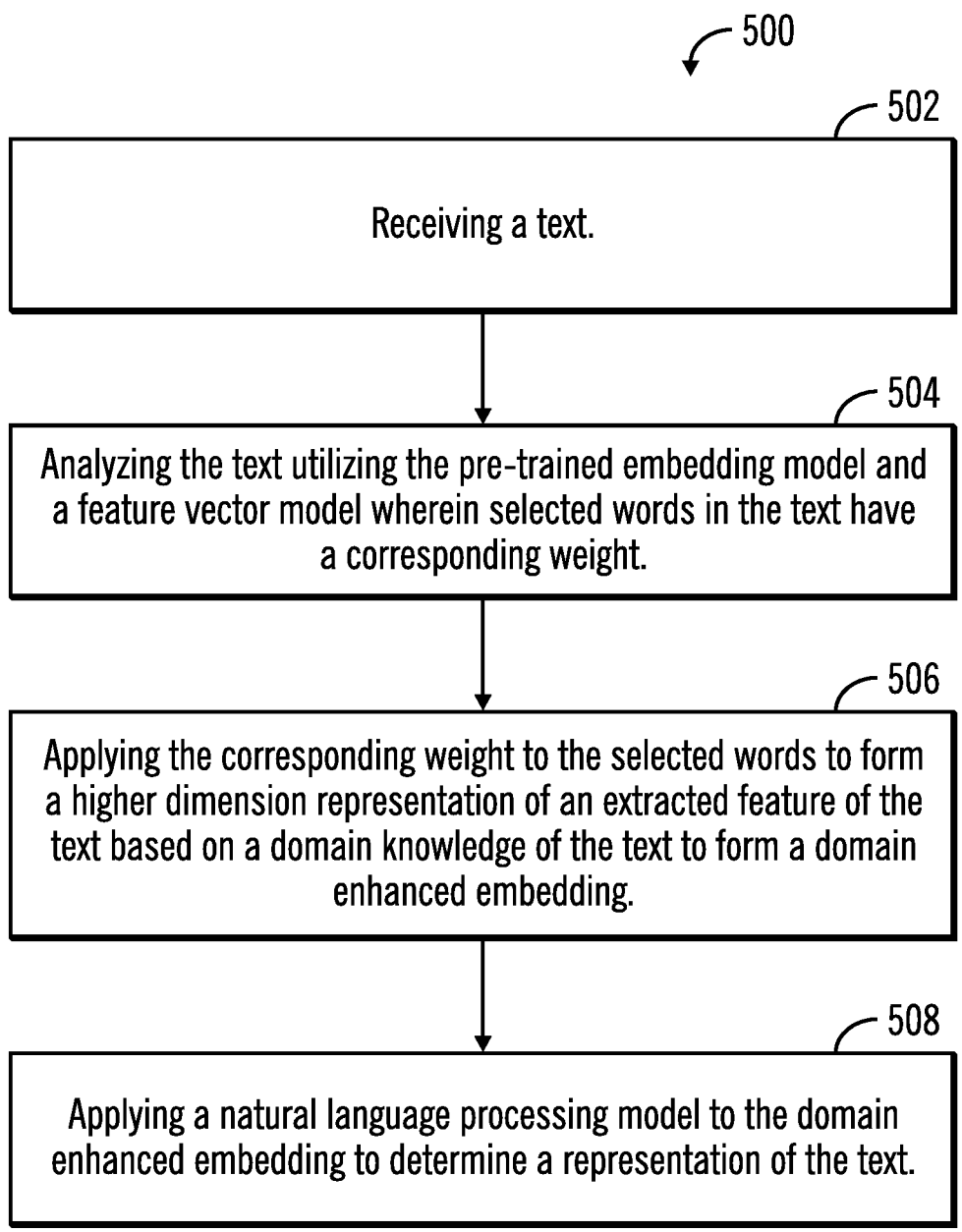
FIG. 5 illustrates a second flowchart that shows the generation of a representation of text by applying weights to domain specific word embeddings, in accordance with certain embodiments.

FIG. 5 illustrates a second flowchart 500 that shows the generation of a representation of text by applying weights to domain specific word embeddings, in accordance with certain embodiments. In certain embodiments, the operations shown in FIG. 5 may be performed by the text representation application 104, the custom feature extraction application 108 and the domain specific word embedding application 110 that execute in the computational device 102.

Control starts at block 502 in which a text is received. The received text is analyzed by utilizing a pre-trained embedding model and a feature vector model, wherein selected words in the text have corresponding weights (at block 504).

From block 504 control proceeds to block 506 in which corresponding weights are applied to the selected words to form a higher dimension representation of an extracted feature of the text based on a domain knowledge of the text to form a domain enhanced embedding. A natural language processing model may be applied (at block 506) to the domain enhanced embedding to determine a representation of the text.

Figure 6:
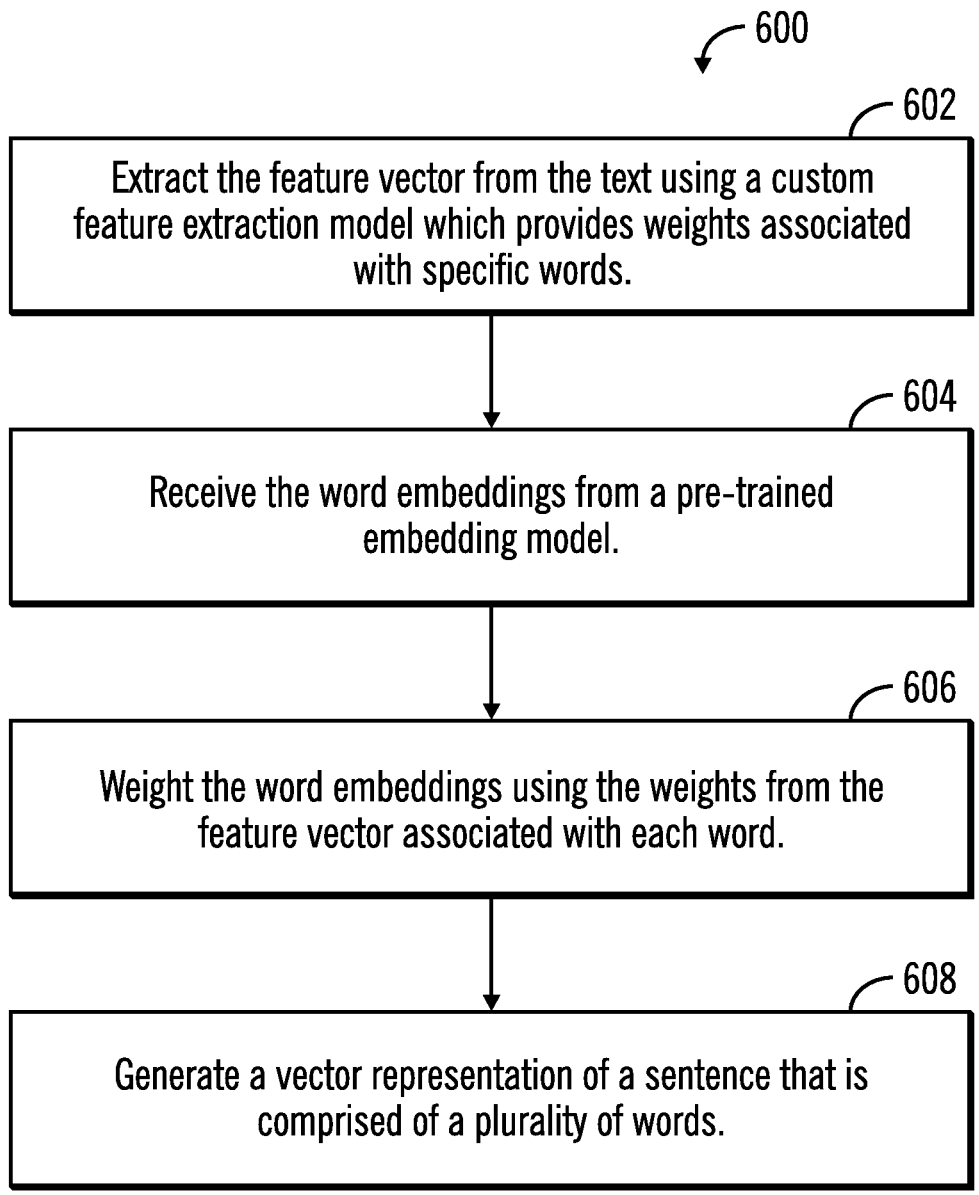
FIG. 6 illustrates a third flowchart that shows the generation of a representation of text by applying weights to domain specific word embeddings, in accordance with certain embodiments.

FIG. 6 illustrates a third flowchart 600 that shows the generation of a representation of text by applying weights to domain specific word embeddings, in accordance with certain embodiments. In certain embodiments, the operations shown in FIG. 6 may be performed by the text representation application 104, the custom feature extraction application 108 and the domain specific word embedding application 110 that execute in the computational device 102.

Control starts at block 602 in which feature vectors are extracted from a text using a custom feature extraction model which provides weights associated with specific words. The words embeddings are received (at block 604) from a pre-trained embedding model.

From block 604 control proceeds to block 606 in which the word embeddings are weighted using the weights from the feature vector associated with each word. A vector representation of a sentence that is comprised of a plurality of words is generated (at block 608) as a result of the process illustrated in FIG. 6.

Therefore, FIGS. 1-6 enhances the representation of text in a natural language processing system by integrating custom feature extraction with domain specific word embedding by using a weighting mechanism. The representation may be used to classify text by providing metadata or for summarization of the text to improve the operations of a natural language processing system that executes in a computational device.

In certain embodiments, feature vectors from a custom text vectorization model are used to represent observations within the dataset. Each feature is associated with a word. Certain embodiments use transfer learning from a pre-trained embedding to create a dimensionality increase for those keywords thereby giving models further down the pipeline more information, context, and understanding for a given text document.

Certain embodiments provide mechanisms to transfer domain knowledge learning to train a text classification model on a small data set of documents which improves classification results. Such embodiments may improve the document classification process of adding labels as metadata to documents, which later on may be used to query the relevant documents when needed.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 7:
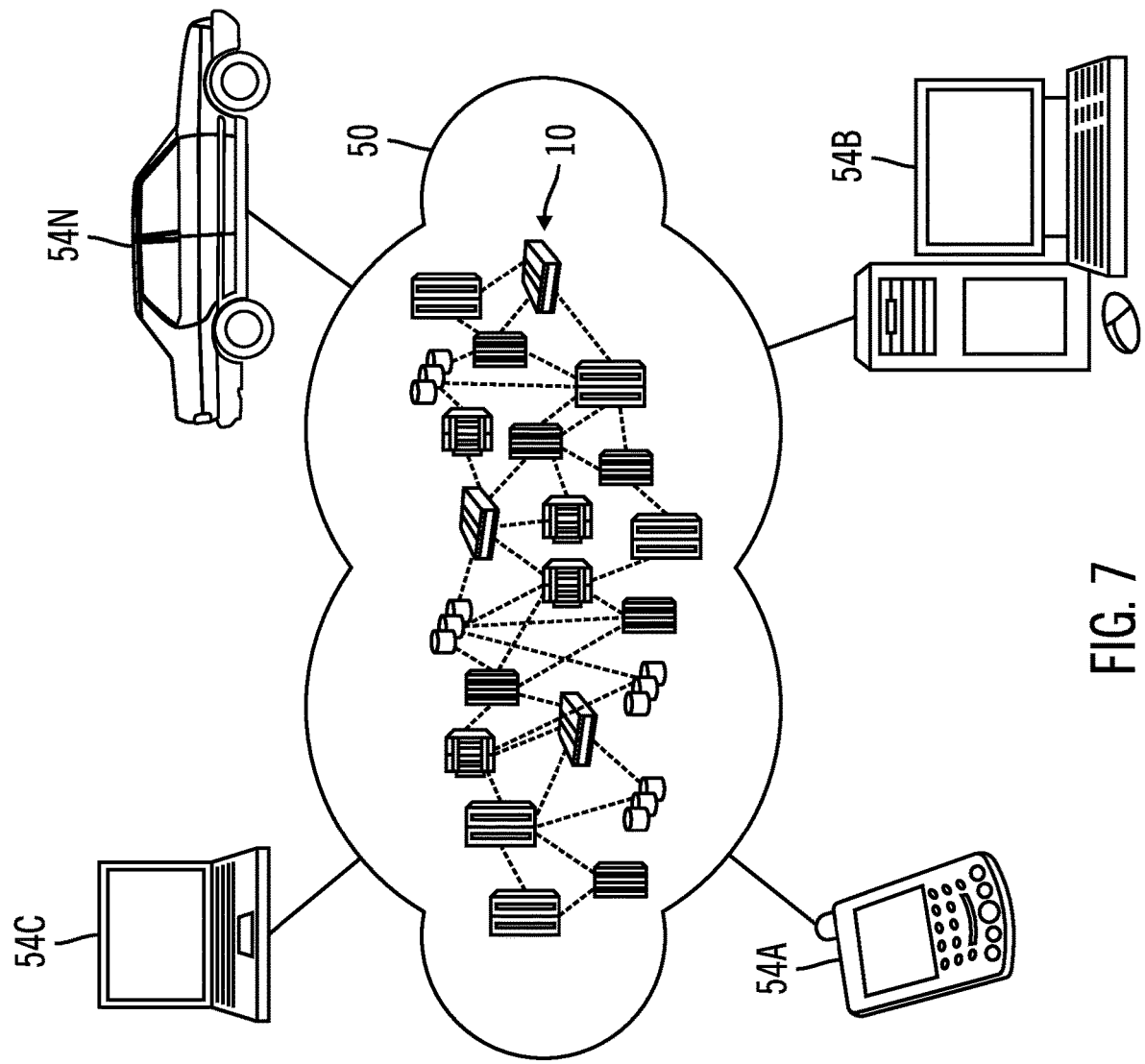
FIG. 7 illustrates a block diagram of a cloud computing environment, in accordance with certain embodiments.

Referring now to FIG. 7 an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
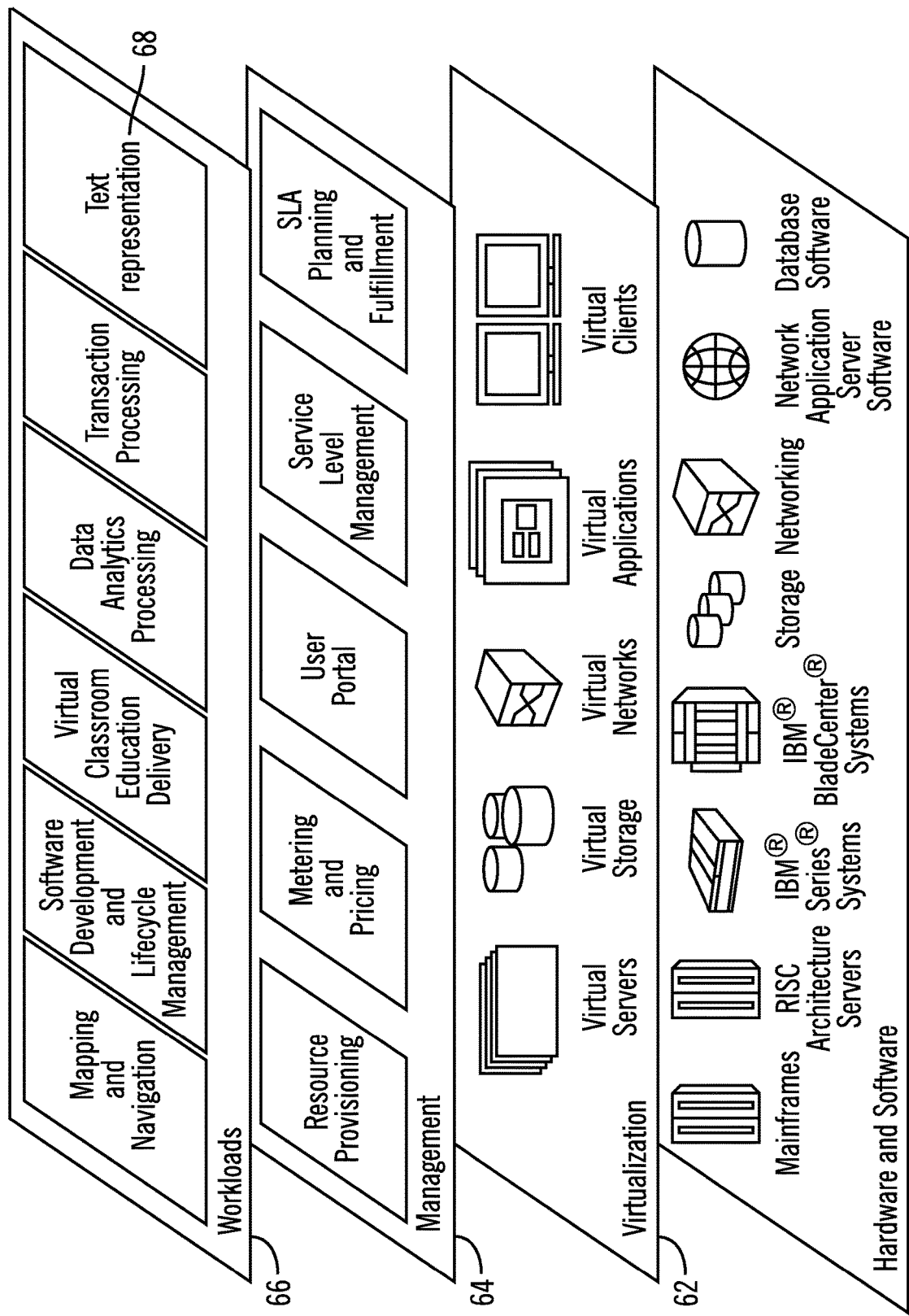
FIG. 8 illustrates a block diagram of further details of the cloud computing environment of FIG. 7, in accordance with certain embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM Web Sphere* application server software; and database software, in one example IBM DB2* database software.

* IBM, zSeries, pSeries, xSeries, BladeCenter, Web Sphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and text representation 68 as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 9:
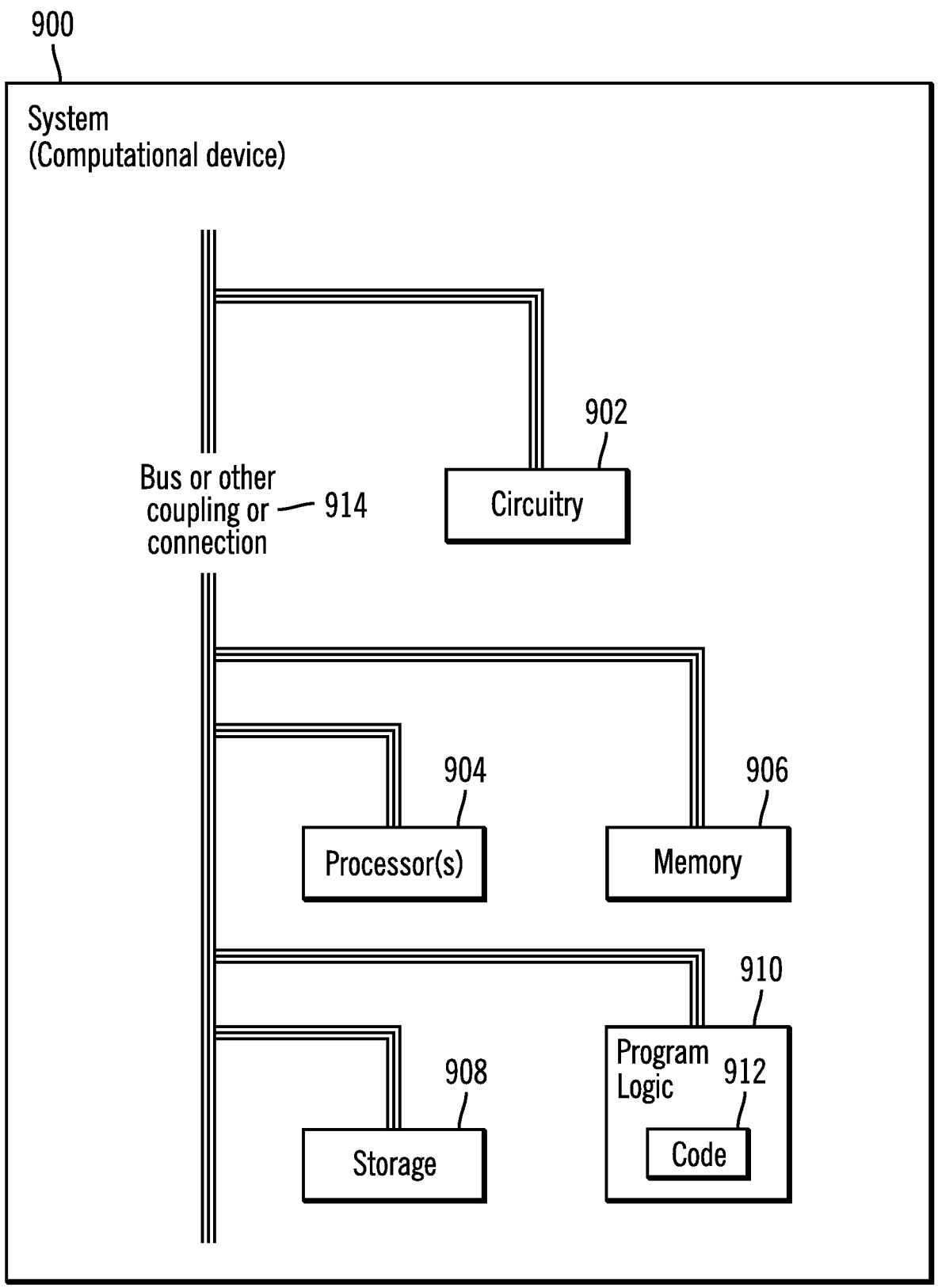
FIG. 9 illustrates a block diagram of a computational system as described in FIGS. 1-9, in accordance with certain embodiments.

FIG. 9 illustrates a block diagram that shows certain elements that may be included in the computational device 102 in accordance with certain embodiments. The system 900 may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. One or more of the components in the system 900 may communicate via a bus or via other coupling or connection 914. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods, and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified, or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for representing text, the method comprising:
receiving a text;
analyzing the text by utilizing a pre-trained embedding model and a feature vector model, wherein selected words in the text have corresponding weights;
performing operations whose parameters include weights of a feature vector and an embedding to generate a weighted embedding data structure, wherein the feature vector includes a first plurality of keywords that comprise words of a sentence, and at least a one additional keyword that provides additional information, wherein the one additional keyword is not in the sentence, and wherein each of the first plurality of keywords and the one additional keyword have associated weights that correspond to the weights of the feature vector;
performing a summation of all corresponding columns of a plurality of rows of the weighted embedding data structure to generate a data structure that represents the text; and
utilizing the data structure that represents the text to generate at least one of a classification metadata for the text and a summarization of the text.

2. The method of claim 1, wherein the data structure that represents the text has a single row and a plurality of columns, wherein the plurality of columns corresponds to embedding dimensions.

3. The method of claim 2, wherein entries for each column of the single row are generated by summing weighted entries of a plurality of rows of an identical column of the weighted embedding data structure.

4. The method of claim 2, wherein the embedding is represented as a multi-dimensional data structure, wherein each row of the multi-dimensional data structure has a correspondence to a selected word, and each column of the multi-dimensional data structure corresponds to an embedding dimension.

5. The method of claim 2, wherein the weighted embedding data structure is represented as a multi-dimensional data structure, wherein each row of the multi-dimensional data structure has a correspondence to a selected word, and each column of the multi-dimensional data structure corresponds to an embedding dimension, and wherein each entry of the multi-dimensional data structure is weighted based on the weights of the feature vector.

6. The method of claim 1, wherein the performing of operations to generate the weighted embedding data structure comprises:
 performing a dot product of the weights of the feature vector and the embedding.

7. The method of claim 1, wherein the text is represented by utilizing transfer learning from the pre-trained embedding model.

8. A system for representing text, the system comprising:
 a memory; and
 a processor coupled to the memory, wherein the processor performs operations, the operations performed by the processor comprising:
 receiving a text;
 analyzing the text by utilizing a pre-trained embedding model and a feature vector model, wherein selected words in the text have corresponding weights;
 performing operations whose parameters include weights of a feature vector and an embedding to generate a weighted embedding data structure, wherein the feature vector includes a first plurality of keywords that comprise words of a sentence, and at least a one additional keyword that provides additional information, wherein the one additional keyword is not in the sentence, and wherein each of the first plurality of keywords and the one additional keyword have associated weights that correspond to the weights of the feature vector;
 performing a summation of all corresponding columns of a plurality of rows of the weighted embedding data structure to generate a data structure that represents the text; and
 utilizing the data structure that represents the text to generate at least one of a classification metadata for the text and a summarization of the text.

9. The system of claim 8, wherein the data structure that represents the text has a single row and a plurality of columns, wherein the plurality of columns corresponds to embedding dimensions.

10. The system of claim 9, wherein entries for each column of the single row are generated by summing weighted entries of a plurality of rows of an identical column of the weighted embedding data structure.

11. The system of claim 9, wherein the embedding is represented as a multi-dimensional data structure, wherein each row of the multi-dimensional data structure has a correspondence to a selected word, and each column of the multi-dimensional data structure corresponds to an embedding dimension.

12. The system of claim 9, wherein the weighted embedding data structure is represented as a multi-dimensional data structure, wherein each row of the multi-dimensional data structure has a correspondence to a selected word, and each column of the multi-dimensional data structure corresponds to an embedding dimension, and wherein each entry of the multi-dimensional data structure is weighted based on the weights of the feature vector.

13. The system of claim 8, wherein the performing of operations to generate the weighted embedding data structure comprises:
 performing a dot product of the weights of the feature vector and the embedding.

14. The system of claim 8, wherein the text is represented by utilizing transfer learning from the pre-trained embedding model.

15. A computer program product for representing text, the computer program product comprising a computer readable storage medium having computer readable program code embodied therewith, the computer readable program code configured to perform operations, the operations comprising:
 receiving a text;
 analyzing the text by utilizing a pre-trained embedding model and a feature vector model, wherein selected words in the text have corresponding weights;
 performing operations whose parameters include weights of a feature vector and an embedding to generate a weighted embedding data structure, wherein the feature vector includes a first plurality of keywords that comprise words of a sentence, and at least a one additional keyword that provides additional information, wherein the one additional keyword is not in the sentence, and wherein each of the first plurality of keywords and the one additional keyword have associated weights that correspond to the weights of the feature vector;
 performing a summation of all corresponding columns of a plurality of rows of the weighted embedding data structure to generate a data structure that represents the text; and
 utilizing the data structure that represents the text to generate at least one of a classification metadata for the text and a summarization of the text.

16. The computer program product of claim 15, wherein the data structure that represents the text has a single row and a plurality of columns, wherein the plurality of columns corresponds to embedding dimensions.

17. The computer program product of claim 16, wherein entries for each column of the single row are generated by summing weighted entries of a plurality of rows of an identical column of the weighted embedding data structure.

18. The computer program product of claim 16, wherein the embedding is represented as a multi-dimensional data structure, wherein each row of the multi-dimensional data structure has a correspondence to a selected word, and each column of the multi-dimensional data structure corresponds to an embedding dimension.

19. The computer program product of claim 16, wherein the weighted embedding data structure is represented as a multi-dimensional data structure, wherein each row of the multi-dimensional data structure has a correspondence to a selected word, and each column of the multi-dimensional data structure corresponds to an embedding dimension, and wherein each entry of the multi-dimensional data structure is weighted based on the weights of the feature vector.

20. The computer program product of claim 15, wherein the performing of operations to generate the weighted embedding data structure comprises:
 performing a dot product of the weights of the feature vector and the embedding.

* * * * *